3 Sheets—Sheet 1.

J. A. DRAKE.
METHOD OF BALING AND PACKING COTTON.

No. 179,849. Patented July 18, 1876.

Witnesses:
Edwin James.
John K. Jones.

Inventor:
James A. Drake.
per J. E. J. Holmead.
Associate Attorney.

N. PETERS, PHOTO-LITHOGRAPHER, WASHINGTON, D. C.

J. A. DRAKE.
METHOD OF BALING AND PACKING COTTON.

No. 179,849. Patented July 18, 1876.

Witnesses:
Edwin James.
John K. Jones

Inventor:
James A. Drake.
per J. E. J. Holmead
Associate Attorney.

3 Sheets—Sheet 3.

J. A. DRAKE.
METHOD OF BALING AND PACKING COTTON.

No. 179,849. Patented July 18, 1876.

WITNESSES:
Edwin James.
John R. Jones

INVENTOR:
James A. Drake.
per J. E. H. Holmead.
Associate Attorney.

UNITED STATES PATENT OFFICE.

JAMES A. DRAKE, OF NEW ORLEANS, LOUISIANA, ASSIGNOR OF ONE-SIXTH OF HIS RIGHT TO EDGAR C. SINGER, OF HOUSTON, TEXAS.

IMPROVEMENT IN THE METHODS OF BALING AND PACKING COTTON.

Specification forming part of Letters Patent No. 179,849, dated July 18, 1876; application filed April 17, 1873.

*To all whom it may concern:*

Be it known that I, JAMES A. DRAKE, of the city of New Orleans, in the parish of Orleans and State of Louisiana, have invented a new and useful Mode and Method of Baling and Packing Cotton, of which the following is a full, clear, and correct description, reference being had to the accompanying drawings, and the letters of reference marked thereon, making part of this specification, in which—

Figure 1:
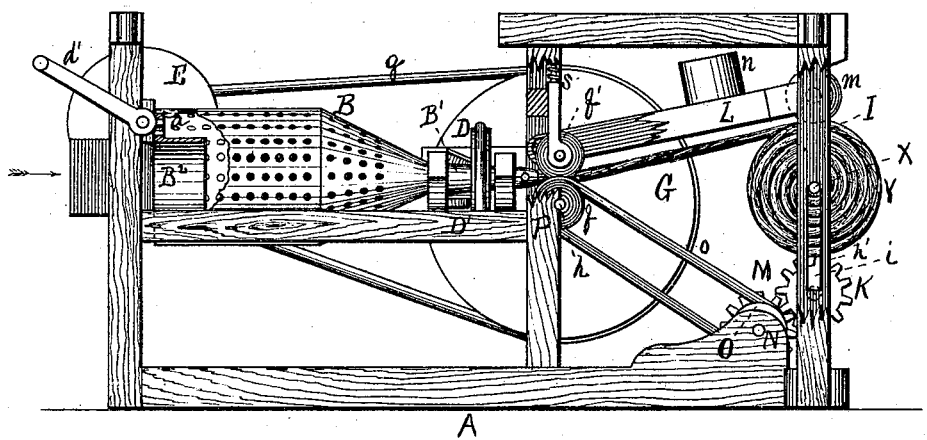
Figure 2:
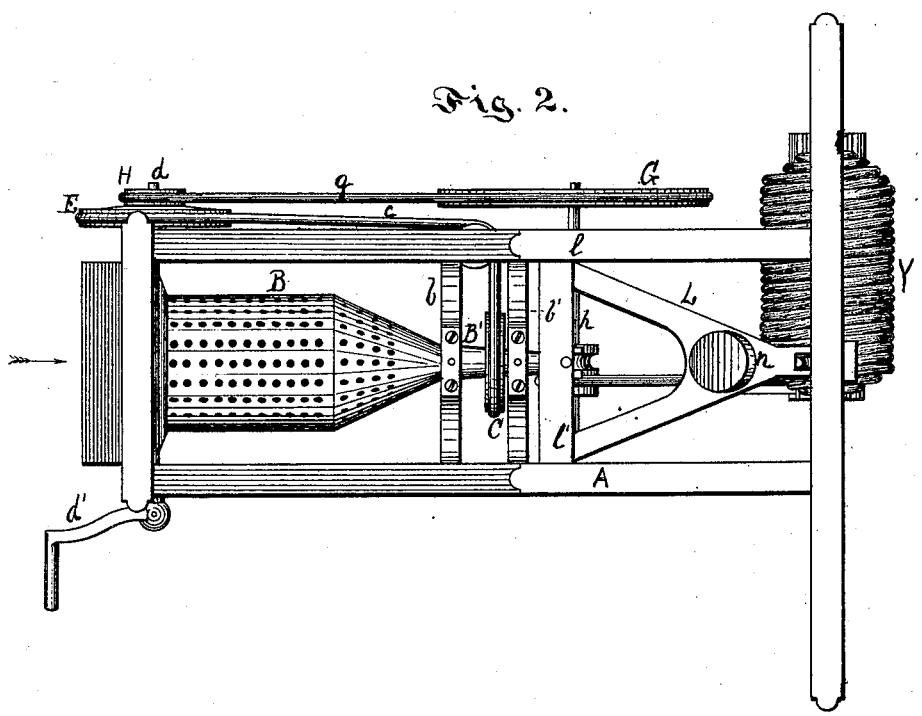
Figure 3:
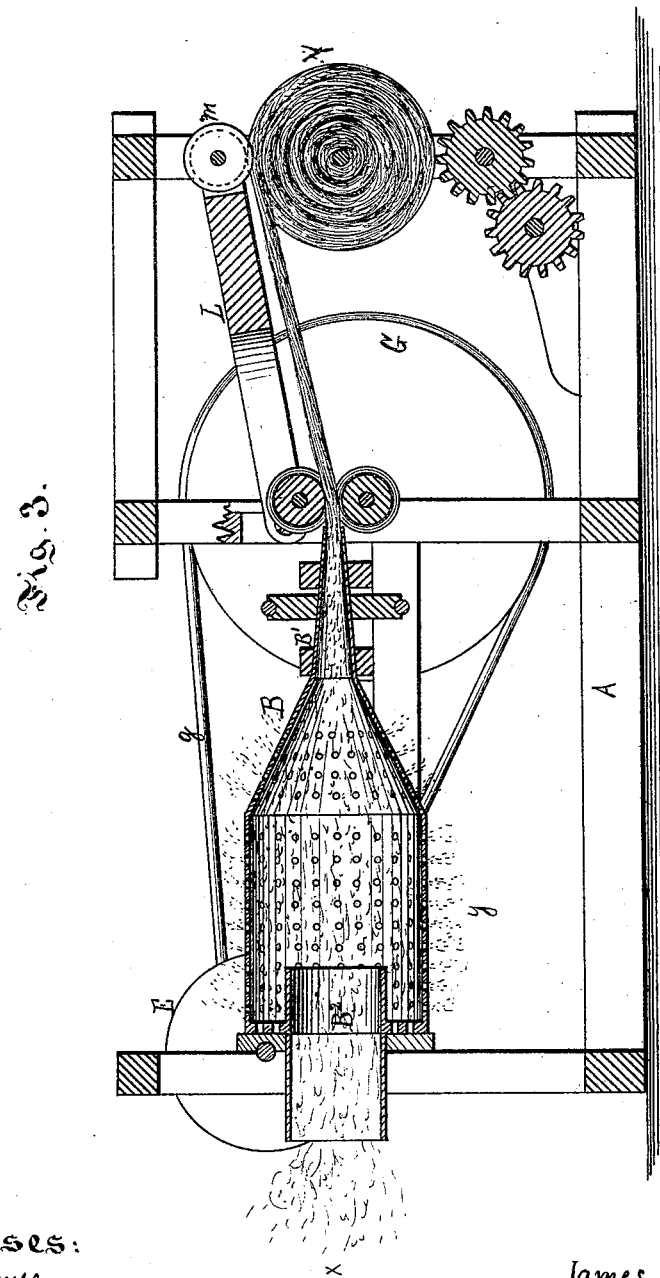
Figure 4:
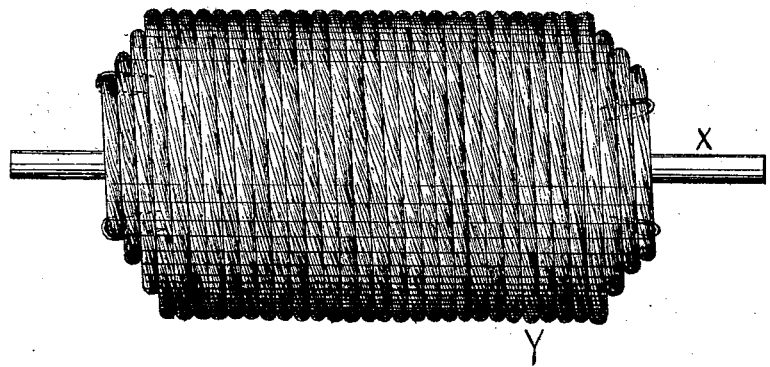
Figure 5:
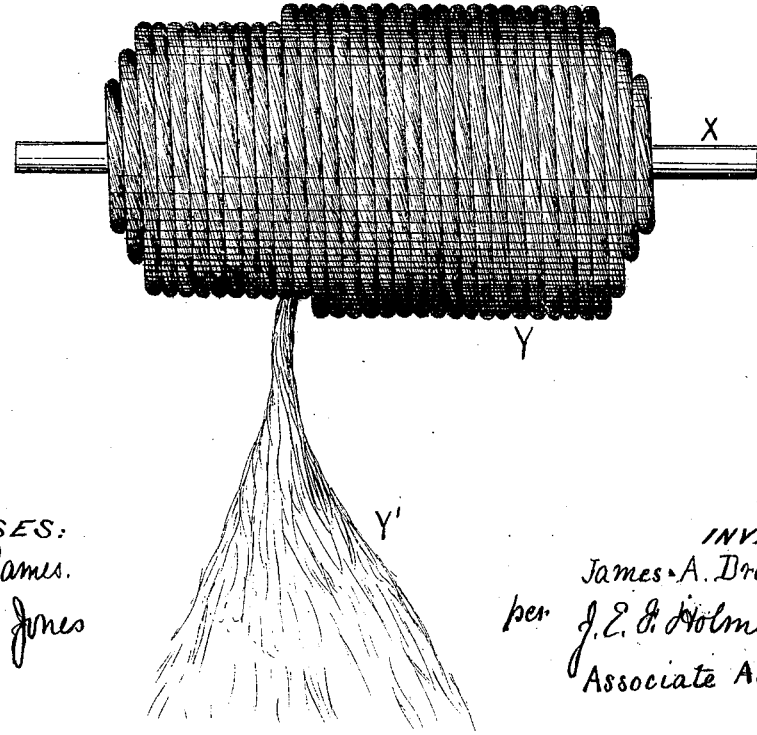

Figures 1, 2, and 3 represent an apparatus suitable and well adapted for the process of forming such a bale as is the distinctive subject-matter embraced in my present application, while Figs. 4 and 5 represent the bale itself, and to which my present invention is confined.

The apparatus itself, which is illustrated in Figs. 1, 2, and 3, forms no part of my present application, being the distinctive subject-matter of a separate application, filed even date herewith.

Therefore, my present improvement, I desire it understood, relates entirely to the peculiar and novel mode of packing and baling cotton, whereby its handling, shipment, and transportation to a market are greatly facilitated.

The object of my improvement is to avoid all the mechanical appliances now used in forming and securing bales of cotton—viz., the press, compress, canvas bagging, bands, buckles, bale-ties, &c.—and all of which are now universally employed, as necessary to suitably pack and secure a cotton-bale, and at the same time to press more cotton into a given space than can possibly be done by the most powerful compressing devices or engines hitherto known and in general use at the present time, whereby I am enabled to economize in the cost of baling or packing as well as that of transportation.

These important results are attained by taking the raw cotton as it comes directly from the gin, and by simple mechanical agencies—such, for instance, as the apparatus hereinafter described, but, for the reasons before stated, constituting no part of my present application—the cotton is loosely twisted, so as to form a continuous strand, the twist simply being sufficient to produce such a continuity of fibers as to permit the cotton to be drawn from the gin or twisting device through the revolution of the axle-shaft, on which it is to be spirally wound and pressed. The size of this loosely-twisted strand of cotton designed to be thus wound and pressed may be varied to accord with that which experience may indicate as the most suitable or desirable.

For general purposes, and for convenient winding and pressing, I loosely form a strand, say, of about an inch in diameter, the precaution being taken not to twist the cotton to the extent to injure or break its fiber.

Owing to the exceedingly slight twist of the cotton-fibers, as practiced in my process in forming a bale, as shown in Figs. 4 and 5, the product is essentially distinct and different from the tightly-twisted fibers of rope, cord, and other like articles.

Another most important advantage resulting from this loose twisting of the fibers of cotton is this: The moment the bale is desired for use at the factory, it is simply necessary to undo the fastened end of the strand and unwind from the axle, the cotton opening and unwinding, as shown in Fig. 5, as rapidly as drawn from the axle.

Thus I bale the cotton, according to my improved process, in such manner as to be most compact in form and most closely pressed without in any manner destroying or injuring its fiber, and without danger of its matting, and also without requiring any device to aid in its untwisting, as would be the case were anything like the formation of an ordinary cotton or other rope contemplated.

I will first describe the bale shown at Sheet 3, Figs. 4 and 5 of the accompanying drawings, and which alone constitutes the subject-matter of my present application, and afterward describe the apparatus illustrated at Figs. 1, 2, and 3, Sheets 1 and 2, and which practical experience has demonstrated most admirably meets the requirements of the improvement embraced in the present application, although I desire it distinctly understood I do not limit myself to the mechanical means illustrated at Figs. 1, 2, and 3, as any other which will accomplish like results may be substituted, and would, of course, come within the scope of my present invention.

X in all the figures, but more clearly shown at Figs. 4 and 5, is a wooden axle, of about two inches square, or of about the same diameter if made round, octagonal, or of any other form of cross-section.

One end of the loosely-twisted cotton-strand, as it comes from the twisting device, is attached to the said axle at a point near one end thereof, and when the said axle is placed in proper bearings resting upon suitable traversing-frame and made to revolve, the strand is wound, and at the same time pressed thereupon in regular alternate layers, giving to the bale a coil formation. Y shows the cotton as twisted, wound, and pressed into a bale, and at Y' is illustrated the way the strands opens when unwound from the axle at the factory, and which results simply from loosing its free end, and then unwinding the strand.

I will now describe an apparatus or machine which can be successively employed in forming such a finished bale as is shown at Figs. 4 and 5, and which is illustrated on Sheets 1 and 2.

A is a substantial frame-work, constructed of wood or any other suitable material. B is a sheet-metal twisting-cylinder, having its forward part conically contracted, and gradually terminating in a narrow, annular slotted delivery-tube, $B^1$, while the internal diameter of a portion of the said twisting-cylinder is diminished by an interior cylinder, $B^2$. The said cylinders B $B^2$ are connected by a base-plate, $a$, which plate, as likewise the periphery of the external cylinder, is finely perforated. The said cylinder B is supported by and rotates in the journal-bearings resting upon the cross-frames $b$ $b'$.

The cotton, as it is forced or blown from the ginning-mill, and as shown at $x$, Fig. 3, is delivered directly into the twisting-cylinder B, through the rear open end thereof, and rapid rotary motion is communicated to the said cylinder through and by means of the pulley C, guide-pulleys D D', belt or rope $c$, and driving-pulley E. The said pulley E is keyed upon the end of the shaft $d$, and may be turned by means of the crank $d'$, or driven by any other suitable motor. The rapid revolution of the said cylinder B imparts rotary motion to that portion of the cotton which is being held by the delivery-tube $B^1$. This de-delivery-tube is slotted, as clearly shown in Fig. 1, so as to admit of its expansion and contraction to accommodate itself to any inequality in the diameter of the twisted strand delivered therefrom. As the cotton is delivered from the said delivery tube or nozzle it is caught between the grooved rollers or pulleys $f$ $f'$ and prevented from further twisting thereby.

The pulley $f$ is permanently keyed upon the axle or shaft $h$, while the pulley $f'$ is secured in a spring-bearing, $s$, and which renders it automatically adjustable to any irregularity of the strand of twisted cotton passing between the pulleys.

Motion is imparted to the pulley $f$, and consequently to the pulley $f'$, through the friction of the passing cotton by means of the large pulley G, which is also keyed to the shaft $h$, and is connected by a band or rope, $g$, with the pulley H, which is keyed at the outer extremity of the shaft $d$.

I is a traveling-frame, having its upright standards $h'$ slotted, as shown at $i$, and in which rotates the axle X, upon which is spirally wound and pressed the loosely-twisted strand.

K is a corrugated cylinder, either of wood or other suitable material, which, as it revolves, is brought into contact with and thereby imparts rotary motion to the twisted cotton accumulating upon the axle X.

L is a frame, secured in pivot-bearings $l$ $l'$, and having secured at its outer section the pressure-grooved roller $m$, the grooved face of which is held down upon the strand being wound by the weight $n$, as the same is being coiled.

The process of spirally winding the twisted strand of cotton in regular layers, especially when it is weighted, as above stated, will obviously produce an alternate traversing motion to the said sliding frame I, and consequently to the bale of cotton resting thereupon.

Rotary motion is imparted to the corrugated cylinder K by means of the toothed pinion M upon the shaft N, which is provided with the pulley O, the latter being connected by the band $o$ with the pulley P keyed to the shaft $h$.

The perforations in the periphery of the twisting-cylinder B, as well as those in the plate $a$, furnish free exit for any dust or dirt, as shown at $y$, Fig. 3, which may, and which usually does, exist to a greater or less extent in cotton as gathered from the plantation, while likewise admitting the free exit of the air which enters the said cylinder with the cotton.

I have now described a suitable means of forming such a bale as constitutes my present invention, and it will readily be seen that the process of winding and simultaneously pressing the strand of cotton in constructing the bale will, by reason of the tensile power and pressure exerted thereupon, have the effect to press the same into a very solid and compact bulk.

What I claim as new, and desire to secure by Letters Patent of the United States, is—

1. As a new article of manufacture, a bale of cotton formed from a continuous strand or strands of loosely-twisted cotton wound or coiled around a shaft or axle, substantially as described.

2. The method herein described of baling and packing cotton, which consists in loosely twisting the cotton to secure a continuity of its fibers, and in then winding or coiling the same around an axle or shaft, substantially as described.

In testimony whereof I have hereunto signed my name to this specification in the presence of two subscribing witnesses.

JAMES A. DRAKE.

Witnesses:
JAMES C. KIDDELL,
H. N. JENKINS.